(12) United States Patent  
Newberg

(10) Patent No.: US 7,017,604 B2
(45) Date of Patent: Mar. 28, 2006

(54) THERMALLY INSULATING INTERFACES

(76) Inventor: Douglas A. Newberg, 37 Ashford Dr., Plainsboro, NJ (US) 08536

( * ) Notice: Subject to any disclaimer, the term of this patent is extended or adjusted under 35 U.S.C. 154(b) by 300 days.

(21) Appl. No.: 10/162,897

(22) Filed: Jun. 6, 2002

(65) Prior Publication Data

US 2002/0185626 A1    Dec. 12, 2002

Related U.S. Application Data

(60) Provisional application No. 60/295,809, filed on Jun. 6, 2001.

(51) Int. Cl.
*F16L 7/00* (2006.01)

(52) U.S. Cl. .................. 137/375; 137/340; 137/341; 251/144; 251/366

(58) Field of Classification Search ............... 137/375, 137/341, 340; 251/366, 144
See application file for complete search history.

(56) References Cited

U.S. PATENT DOCUMENTS

| | | | | |
|---|---|---|---|---|
| 2,564,427 A | * | 8/1951 | De Rugeris | 228/53 |
| 2,994,338 A | | 8/1961 | Wilson | |
| 4,161,647 A | * | 7/1979 | Carbonnel | 392/473 |
| 4,218,607 A | * | 8/1980 | Noland | 392/468 |
| 4,296,776 A | | 10/1981 | Muller et al. | |
| 4,836,236 A | | 6/1989 | Ladisch | |
| 5,494,195 A | | 2/1996 | Knuettel, II et al. | |
| 5,651,473 A | | 7/1997 | Preston et al. | |
| 5,786,209 A | | 7/1998 | Newberg | |
| 5,975,119 A | * | 11/1999 | Silva et al. | 137/341 |
| 6,345,640 B1 | * | 2/2002 | Newberg | 137/15.05 |

* cited by examiner

*Primary Examiner*—A. Michael Chambers

(57) ABSTRACT

At least one of a valve body, a sealing tip and a vessel or conduit includes at least one space formed therein between an interior of the vessel or conduit and an internal cavity of the valve. The space includes an active or passive thermal insulation forming at least a partial barrier to the flow of heat between the internal cavity and the interior of the vessel or conduit.

21 Claims, 14 Drawing Sheets

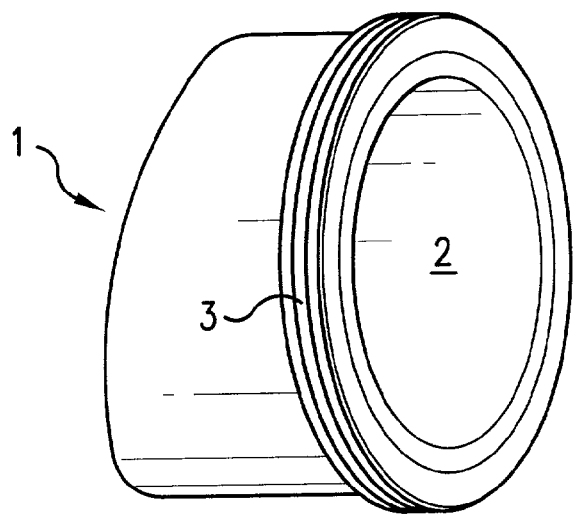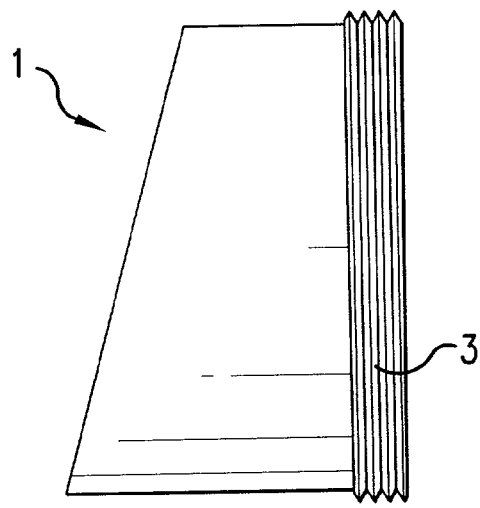
FIG.1A  FIG.1B
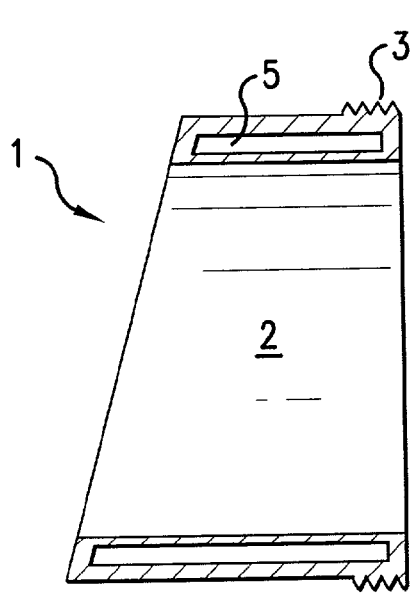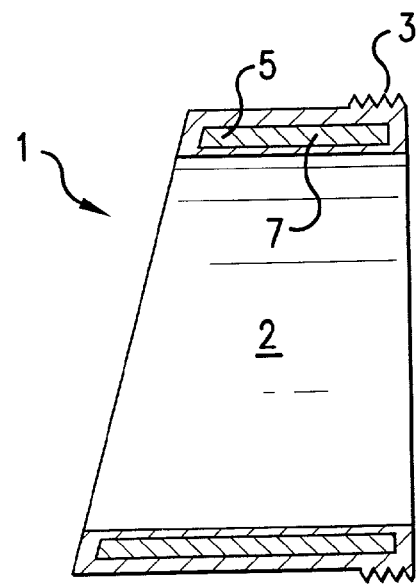
FIG.1C  FIG.1D

THERMALLY INSULATING INTERFACES

CROSS-REFERENCE TO RELATED APPLICATIONS

This application claims priority under 35 U.S.C. § 119(e) of U.S. Provisional Application No. 60/295,809 filed on Jun. 6, 2001, the entire contents of which is hereby incorporated by reference.

BACKGROUND OF THE INVENTION

1. Field of the Invention

The present invention is directed to thermally insulated interfaces. In particular, the present invention is directed to the provision of thermal insulation between the interior of a vessel or conduit and an internal cavity of an adjacent device such as a valve, which forms at least a partial barrier to the flow of heat between the internal cavity and the interior of the vessel or conduit.

2. Description of Background Art

Various sanitary processes require removal of or addition of materials in aseptic fashion. Tanks and conduits are equipped with valves and other process equipment whose process contact surfaces can be cleaned, sanitized or sterilized before being opened to the process. Sterilization, sanitization and even cleaning procedures often require the use of hot media (high temperature steam, for example) to be fed through these devices while they remain attached to, but closed off from direct communication with process vessels or conduits filled with heat-labile process material. When the hot media is fed through these attached devices, a significant amount of heat may be transferred through the device body or attachment device into the vessel or conduit wall and then into the process material or, in cases where these devices include shared walls or integrated process interfaces, heat may be transferred directly from the surfaces of the device body into the process. Process material in the area that is heated may change significantly and irreversibly in character. If a significant amount of material is affected, the production batch may go out of specification and may have to be discarded.

Industrial processes used in the production of foods, beverages, pharmaceuticals, cosmetics and many other products often yield better results if they are carried out under aseptic conditions. Aseptic processing provides added assurance that the final products will have few contaminants, be of more consistent character and of higher quality. To achieve production system asepsis, equipment is usually first cleaned and then sterilized by exposing all surfaces that may come in contact with the process to a hot, moist pressurized environment. This is most frequently and effectively accomplished by supplying clean, hot pressurized steam to all parts of the system that will come in contact with process material before starting the process. Specifically, all vessels, piping, valves, pumps, mechanical agitator seals, filter housings and their filter elements, heat exchangers as well as many other types of equipment are typically cleaned and sterilized.

Once production begins it is usually no longer possible to re-sterilize equipment containing the process material, because the introduction of hot steam would denature many components of the process as well as dilute the process and result in a significant reduction in the overall quality of the product. To protect the aseptic integrity of the process; however, any barrier between equipment containing the production material and another part of the system is usually re-sterilized before being opened to the process. If valves include barriers isolating the process from moving elements and the outside environment (diaphragms or bellows, for instance), re-sterilization is easily conducted by supplying steam through the valve cavity around the barrier element and the valve seal with the process. If a valve, pump or agitator is equipped with sliding or rotating seals (o-rings, packing, etc.) or other types of dynamic non-barrier seals, it is necessary to supply steam through the main cavity through which the process will flow. In addition, it is also desirable to expose the rear non-process side of the seal and adjacent portions of reciprocating or rotating shafts that might come into contact with the process directly or indirectly so that they are also sterile. Because these latter types of seals do not form complete barriers to the process, periodically or continuously steam sterilizing proximal non-process side surfaces can be an effective means of minimizing the risk of microorganism contamination. For this reason many devices that include non-barrier type seals are supplied with double seals wherein there is a process contacting primary seal and a non-process contacting secondary seal. In this way a continuous or periodic live steam barrier to microbial incursion can be established and maintained in the seal housing between the two seals.

The general problem associated with using steam to sterilize, re-sterilize or, where necessary, continuously sterilize (as in the case of an agitator mechanical seal), is the undesirable consequence that adjacent surfaces of equipment also heat up along with the surfaces of equipment intended to be sterilized. Sometimes the adjacent surfaces may also reach sterilization or near-sterilization conditions. While this may not be a problem when sterilizing components that are positioned at a distance from the process, if they are located at or very near an interface with the process, heat can be transferred in significant amounts to the process. Sometimes the amount of heat can be significant enough to affect the process. Furthermore, the temperature of process contact surfaces can rise to levels where process material degrades or forms coatings that may build up on surfaces if heating occurs over an extended period or when component sterilization cycles are repeated many times. Compounding this problem is the difficulty of removing these coatings after a process run. Furthermore, if they are not removed, they pose a threat as contaminants to future process runs.

An obvious alternative approach might be to apply less heat load and try to sterilize at lower temperatures. While this may be an effective alternative approach in some situations, it carries its own risks. A concern would be whether or not the sealing area surface that forms the boundary between process and non-process sides ever reaches sterilization conditions. This surface, shielded by the sealing diaphragm, o-ring, bushing or other sealing element, receives heat indirectly through the walls or the mating sealing element on the side being sterilized. In addition, at the same time, the surface is indirectly cooled by the process on the process side. If the area never reaches sterilization conditions it may serve as a safe haven for contaminating microbes that would be reintroduced into the process when the seal is temporarily broken.

For many industrial processes today, particularly pharmaceutical processes, the exposure of process to excessive temperatures or heat loads, the presence of small amounts of degradants or baked on plaque carried over from earlier batches represent significant threats to quality production. It is desirable, therefore, to find a way to reduce local heat loading and surface temperature excursions at process interfaces that come about as a consequence of heat sanitizing or sterilizing process components.

SUMMARY OF THE INVENTION

In order to minimize the above effect, the present invention includes an insulated flange or ferrule or mounting plate in the case of being mounted to the tank or conduit and receiving the valve or other devices or the valve or device itself including a body cavity that is empty or is filled with an insulating material so that, in both cases or a combination of both cases, the application of heat to clean, sanitize or sterilize the inside of the valve or device is attenuated by insulating elements before it can be transmitted into the process contained in the vessel or conduit.

In order to minimize or avoid all together the damage that occurs when seals and their adjacent surface areas (valves, actuators, etc.) are re-sterilized or continuously sterilized during production, the present invention includes a thermal isolating element or elements that are introduced into one or more of the structural elements of the valve body, mechanical seal, flange and/or ferrule. These elements may provide thermally isolating qualities to the system either passively or actively. These elements would be placed between the heat source (the lateral walls and end wall about the sealing surface as well as within the sealing element or elements) and the walls of the vessel or conduit adjacent the process. In the case of passive thermal insulation, one or more of the structural elements of the valve body, mechanical seal, flange and/or ferrule may have an unfilled cavity or cavities or may have a cavity or cavities partly or completely filled with materials providing improved thermal isolation insulating. Such materials might include ceramics, metals or other materials and materials of a porous nature that do not transfer heat as well as the materials used for the construction of the structural elements of the valve body, mechanical seal, flange and/or ferrule. Furthermore, the structural elements of the valve body, mechanical seal, flange and/or ferrule themselves may be made of materials having superior thermal isolating properties. Alternatively, the structural elements of the valve body, mechanical seal, flange and/or ferrule may include thermal isolating elements that are active. Active thermal insulation means a thermally active (intended to heat or cool) flowable material would be supplied and removed from cavities within the structural elements or between elements of the valve body, mechanical seal, flange and/or ferrule or an electrical current would be applied to a thermoelectric element or set of elements placed within or between structural elements of the valve body, mechanical seal, flange and/or ferrule so as to preferentially heat and/or cool surfaces thereof. Finally, it is also intended that these elements be combined in various ways so as to achieve the intended result of limiting the rise in temperature and transfer of heat load from within the valve body, mechanical seal, flange or ferrule to the process.

In order to accomplish the above, according to one aspect of the present invention, a valve assembly, comprises:

a vessel or conduit, said vessel or conduit including a process on an interior thereof; and a valve, said valve including:

a valve body;

an internal cavity formed in said valve body;

an orifice formed in said valve body, said orifice being in communication with said internal cavity and said interior of said vessel or conduit;

a sealing tip for opening and closing said orifice; and an outlet formed in said valve body, said outlet being in communication with said internal cavity, wherein at least one of said valve body, said sealing tip and said vessel or conduit includes at least one space formed therein between said interior of said vessel or conduit and said internal cavity, said at least one space including an active or passive thermal insulation forming at least a partial barrier to the flow of heat between said internal cavity and said interior of said vessel or conduit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(A) is a perspective view of a ferrule according to a first aspect of the present invention;

FIG. 1(B) is a side view of the ferrule of FIG. 1(A);

FIG. 1(C) is a center longitudinal cross-section of the ferrule of FIG. 1(B)

FIG. 1(D) is a center longitudinal cross-section of the ferrule of FIG. 1(B) according to an alternative arrangement of the present invention;

DETAILED DESCRIPTION OF THE PREFERRED EMBODIMENTS

Figure 2A:
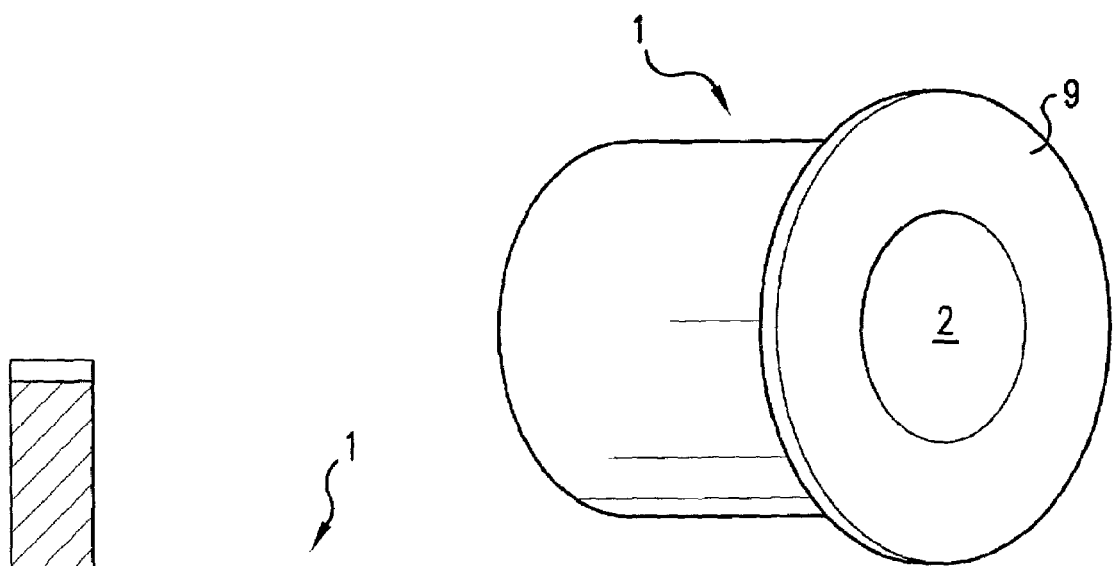
FIG. 2(A) is a perspective view of a sanitary clamping ferrule according to a second aspect of the present invention.

The present invention will now be described with reference to the accompanying drawings, wherein the same reference numerals have been used to identify the same or similar elements.

Referring to FIGS. 1(A)–1(C), a first aspect of the present invention will be described. A ferrule 1 is attachable to a wall 11 of a vessel or conduit 10 (see FIG. 3) through, for example, welding. The ferrule 1 includes threads 3 formed thereon for receiving a valve body 29 of a valve 13 having complimentary threads 30 (see FIG. 3). The ferrule 1 includes a hollow interior 2 in communication an interior 23 of the vessel or conduit 10 when the ferrule 1 is attached to the vessel or conduit 10.

Referring to FIG. 1(C), an annular cavity 5 is formed inside the ferrule 1. In the embodiment of FIG. 1(C), the annular cavity is illustrated as being an empty space which provides one form of a passive thermal insulation, which forms a barrier to the flow of a heat between an internal cavity 23 of the valve 13 and an interior 23 of the vessel or conduit 10 (see FIG. 3).

Referring to FIG. 1(D), the annular cavity 5 is also included; however, a thermal insulation material 7 is filled within the annular cavity 5. The thermal insulation material 7 is an alternative way to providing a passive thermal insulation between the internal cavity 19 of the valve 13 and the interior 23 of the vessel or conduit 10. The thermal insulation material is a material having desirable high thermal isolating properties (such as some ceramics). A valve installed and being sterilized in ferrule 1 would have less capacity to transfer thermal energy from the hot valve, through the ferrule to the cooler process.

It should be noted that the annular cavity 5 may also be partially filled with a thermal insulation material 7 or may include several different thermal insulation materials therein which work in conjunction with each other to provide a barrier to the flow of heat.

As an alternative, it is also possible to provide a passive thermal insulation by constructing the ferrule 1 of a thermal insulation material or a portion of the ferrule 1 of a thermal insulation material. For example, the ferrule 1 can be constructed of a ceramic material, which is welded to the vessel or conduit 10. Since the ferrule 1 is constructed of such material, a barrier to the flow of heat from the internal cavity 19 of the valve 13 to the interior 23 of the vessel or conduit 10 will also be provided.

In addition to passive thermal insulation, it is also possible to include an active thermal insulation within the annular cavity 5. Different forms of active thermal insulation will be described hereinbelow.

It should also be pointed out that throughout the following description, any cavity such as the annular cavity 5 can include a passive thermal insulation or an active thermal insulation, depending on the particular application.

Figure 2C:
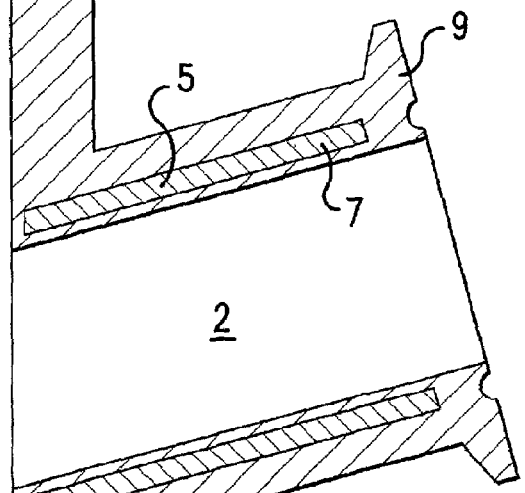
FIG. 2(C) is a cross-section of the ferrule of FIG. 2(A) according to an alternative arrangement of the present invention.
Figure 2B:
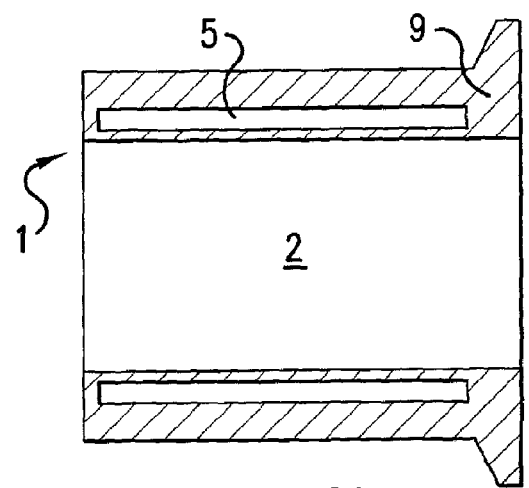
FIG. 2(B) is a cross-section of the ferrule of FIG. 2(A)

Referring to FIGS. 2(A)–(C), an alternative arrangement of the present invention is illustrated. The ferrule 1 includes a flange 9 as an alternative to the threads 3 in the embodiment of FIGS. 1(A)–1(D). The flange 9 is well known arrangement that would cooperate with a corresponding flange on the valve body 29 of a valve 13. The two flanges would be secured together through the use of a sanitary clamp 31 (see FIG. 6). In FIG. 2(B), an empty annular cavity 5 is formed in the ferrule 1, which is illustrated as being filled with a thermal insulation material 7 in FIG. 2(C). Of course, it would also be possible to provide other types of passive or active thermal insulation as well within the annular cavity 5.

Figure 3:
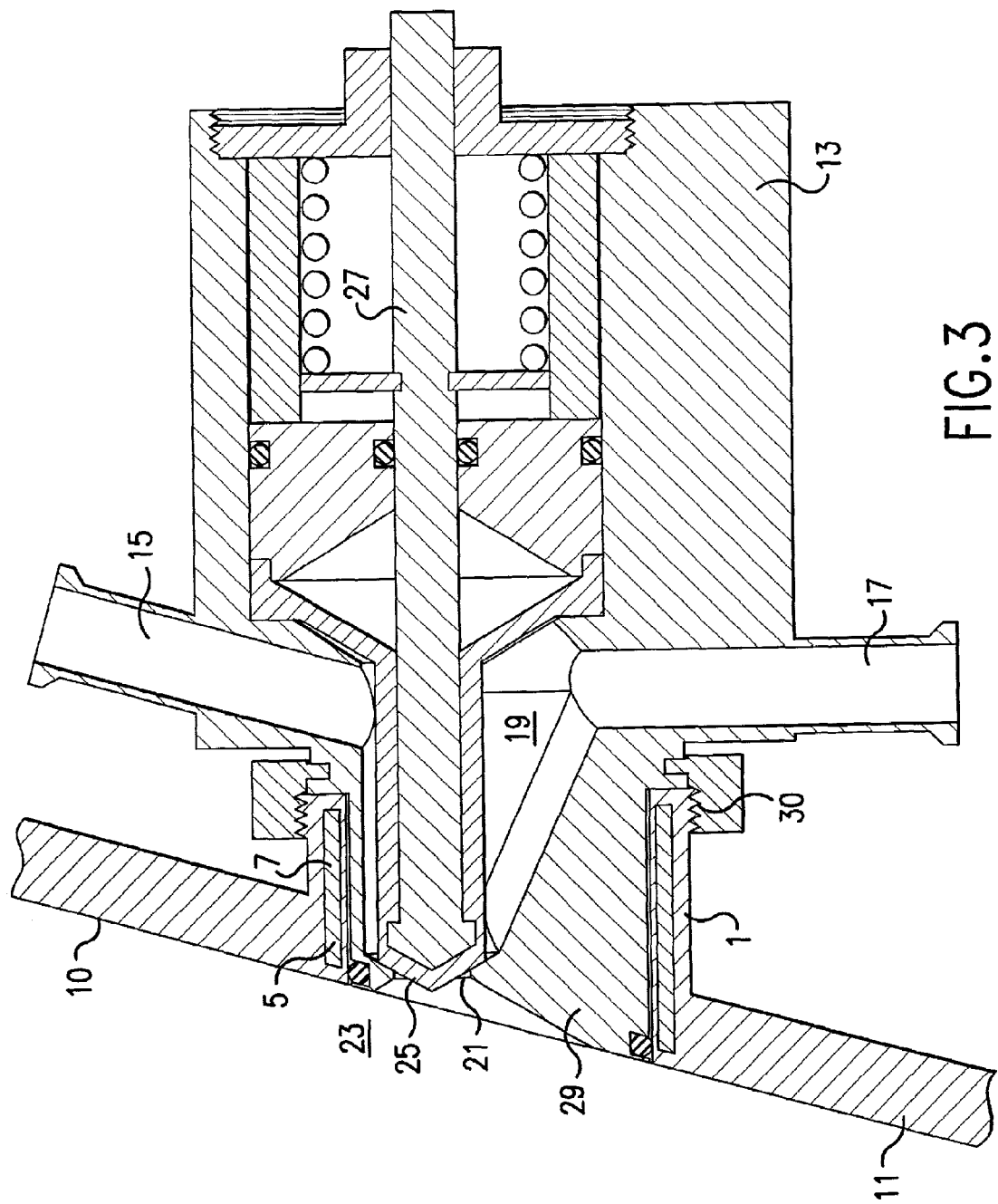
FIG. 3 is a cross-sectional view illustrating the ferrule of FIG. 1(D) mounted in the wall of a tank with a valve connected thereto.

Referring to FIG. 3 of the present invention, the ferrule 1 is illustrated as being mounted to the wall 11 of the vessel or conduit 10 and connected to a valve 13. The valve 13 includes an inlet 15 and an outlet 17 in communication with the internal cavity 19. In addition, an orifice 21 is in communication with the internal cavity 19 and is in communication with an interior 23 of a vessel or conduit. The interior 23 would include a process therein as would be understood to one having ordinary skill in the art. The orifice 21 is openable and closeable by a sealing tip 25, which is attached to an actuating rod 27. The actuating rod is mounted for reciprocating motion by a manual or automatic actuator (not shown) to open and close the orifice 21.

As can be clearly understood, when the sealing tip 25 is in the position to close the orifice 21, a cleaning or sterilizing agent can flow through an inlet 15 into the internal cavity 19 and out of the outlet 17. If the cleaning or sterilizing agent is a hot media, a significant amount of heat may be transferred through the valve body 29 of the valve 13 into the process within the interior 23 of the vessel or conduit 10. Since much of this heat transfer occurs through the valve body 29 into the ferrule 1 before reaching the interior 23 of the vessel or conduit the present inventor has determined that providing the annular cavity 5 formed within the ferrule 1 with or without thermal insulation material 7 will form a barrier to the flow of the heat between the internal cavity 19 of the valve 13 and the interior 23 of the vessel or conduit 10.

It should be noted that FIG. 3 illustrates one arrangement of the present invention which includes the ferrule 1 of FIG. (D). It should be understood that the embodiments of FIGS. 1(C), 2(B) or 2(C) could also be used. In addition, it would also be possible to include an active thermal insulation instead of the passive thermal insulation of the annular cavity 5 and/or the thermal insulation material 7.

In the case of FIGS. 1(D), 2(C) and 3 the thermal insulation can also be an active thermal insulation. For example, the annular cavity 5 can include one or more thermoelectric devices therein. The hot side of the thermoelectric devices could supply thermal energy towards the sterilizing valve. At the same time, the thermoelectric devices can actively scavenge the heat and therefore, limit the amount of heat load flowing toward the process. By stacking thermoelectric devices one on top of the other (the chilled surface of an upper unit on top of the heated surface of a lower unit), it is possible to enhance the overall thermal scavenging capabilities beyond that of a single element. In FIGS. 1(D), 2(C) and 3, thin film thermoelectric units would be layered in concentric layers with the cool side facing out and the heated sides facing inward. In FIGS. 2(C) and 3, the elements closest to the process can be oriented with the cooler side of the elements facing the process.

Figure 4:
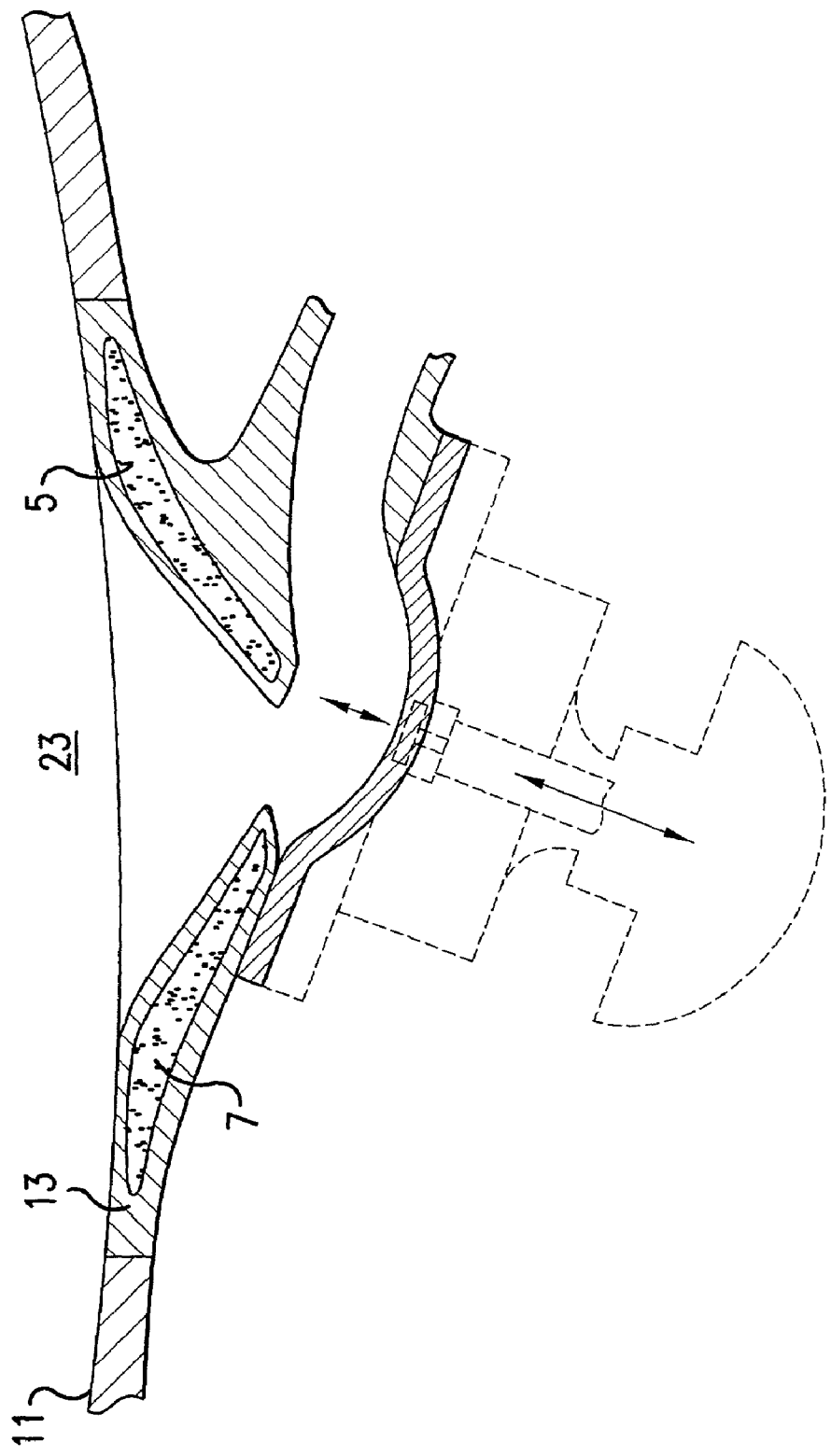
FIG. 4 is a cross-sectional view of a weir diaphragm valve of the present invention mounted in the wall of a tank or conduit.

Referring to FIG. 4 of the present invention, a weir diaphragm valve 13 is illustrated as being mounted in a wall 11 of a vessel or conduit 10. The operation of a weir diaphragm valve is well known to one having ordinary skill in the art and therefore this operation will not be described further.

In FIG. 4, the valve 13 includes an annular cavity 5 formed therein. The internal cavity 5 may include a thermal insulation material 7 therein or may include an active thermal insulation as will be described below.

Figure 5:
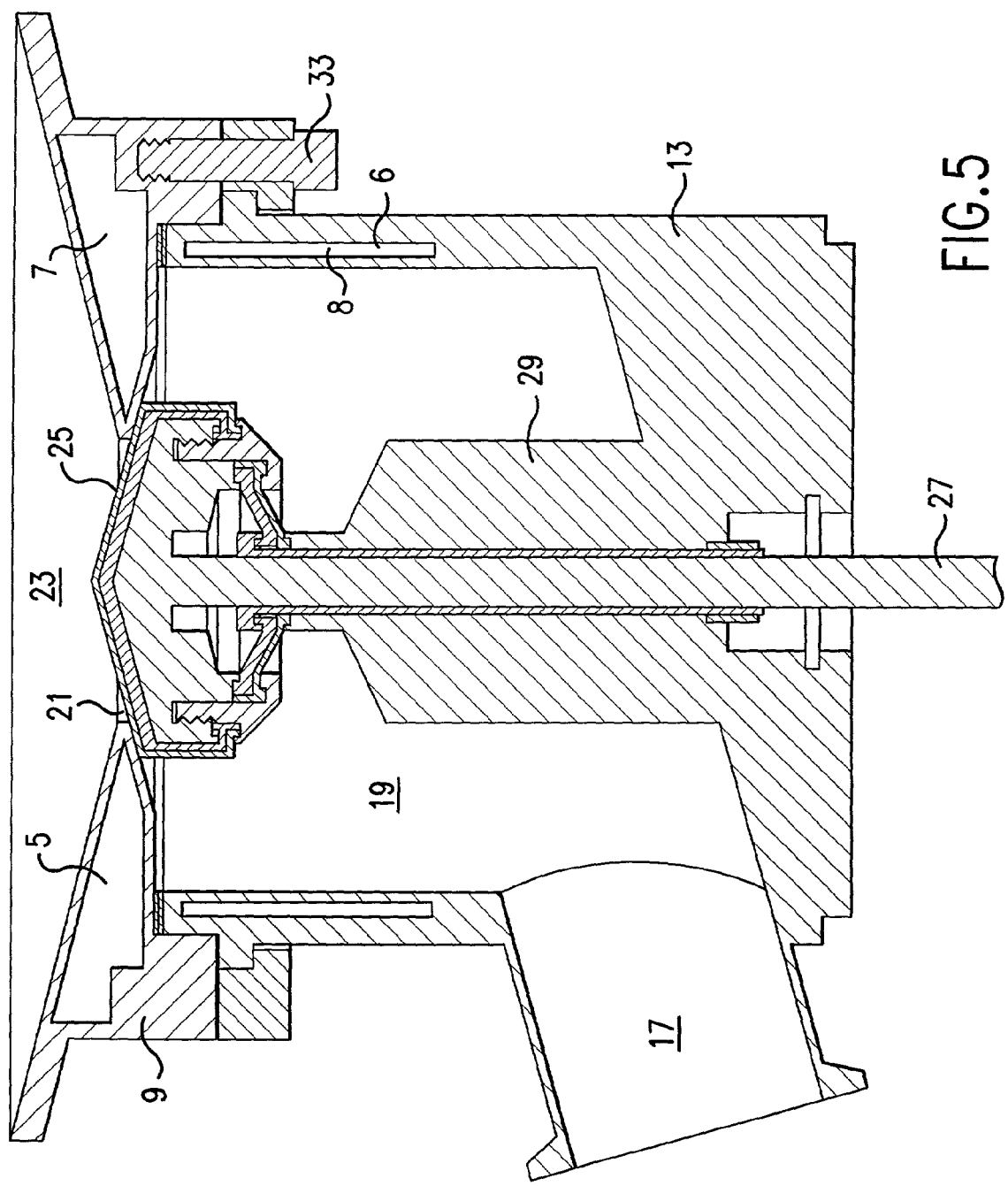
FIG. 5 is a cross-sectional view of a diaphragm valve of the present invention mounted to a mounting flange of the wall of a vessel or conduit.

Referring to FIG. 5, a diaphragm valve 13 also includes an annular cavity 6 that may include thermal insulation material 8. With this arrangement, the thermal insulation material 8 works in tandem with the thermal insulation material 7 formed in the annular cavity 5 of the flange 9. Of course, it is also possible to include empty annular cavities 5 and 6 or to include an active thermal insulation within the annular cavities 5 and 6. It should also be noted that it is not necessary to provide the annular cavities 5 and 6 around an entire circumference of the flange 9 and valve 13, respectively, under some circumstances. In addition, it is also possible to provide multiple of the annular cavities 5 and 6 within each of the flange 9 and valve 13, respectively.

As can be clearly understood from FIG. 5, the annular cavity 6 is located adjacent to the internal cavity 19 of the valve 13. During cleaning or sterilization of the valve 13, a substantial amount of heat would pass through the valve body 29 and into the flange 9, eventually increasing the temperature of the interior 23 of the vessel or conduit 10. By providing thermal insulation in the form of an empty annular cavity 6 or a cavity 6 including thermal insulation 8 therein, the amount of transfer of heat is decreased, thereby protecting the process within the interior 23 of the vessel or conduit 10.

Figure 6:
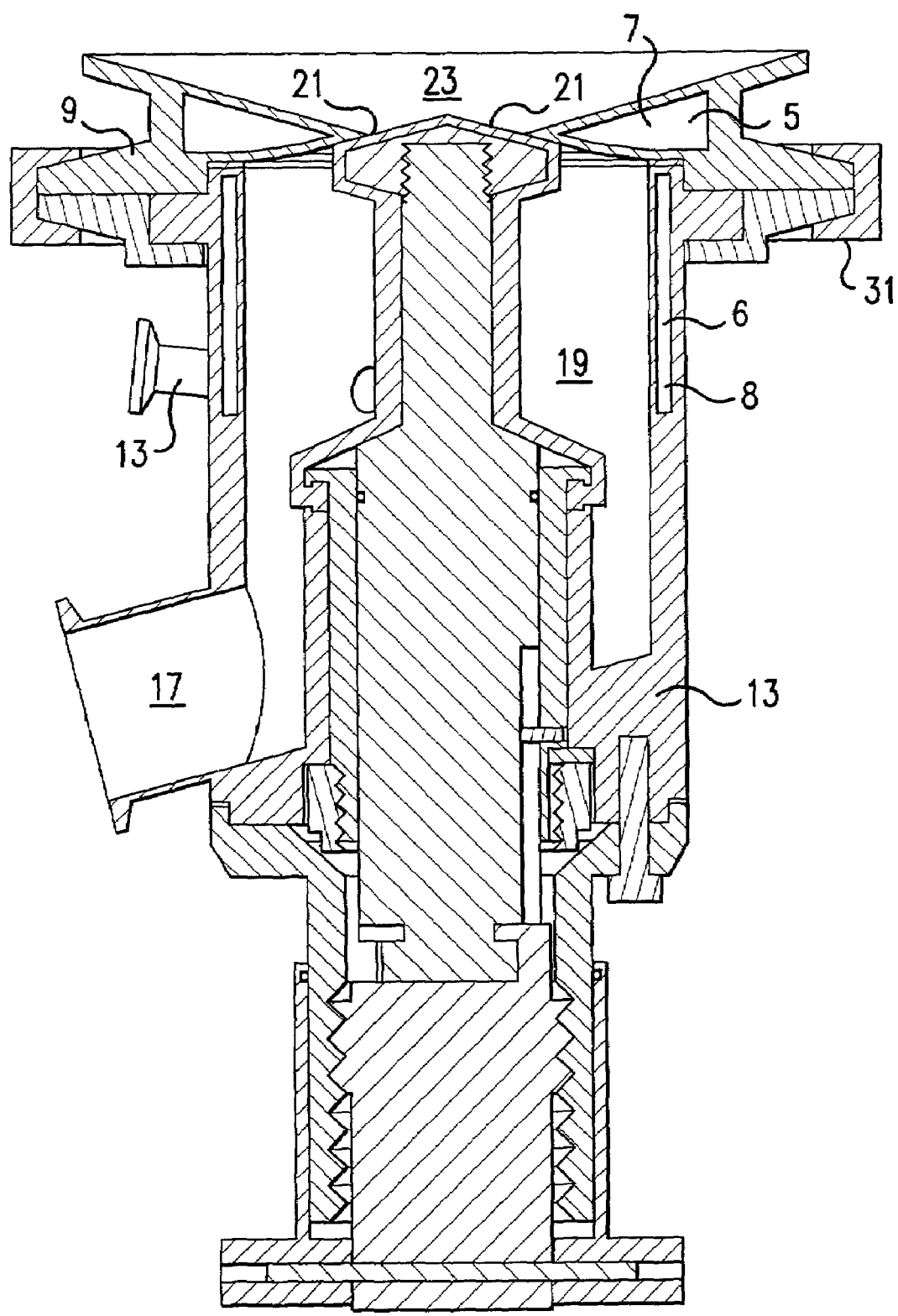
FIG. 6 is a cross-sectional view of a diaphragm valve of the present invention mounted to a mounting flange of the wall of the vessel or conduit according to an alternative arrangement of the present invention.

Referring to FIG. 6, an alternative arrangement of a diaphragm valve 13 is illustrated. In this arrangement, the thermal insulation 8 within the annular cavity 6 will also work in tandem with the thermal insulation material 7 within the annular cavity 5 to protect the process within the interior 23 of the vessel or conduit 10.

Figure 7:
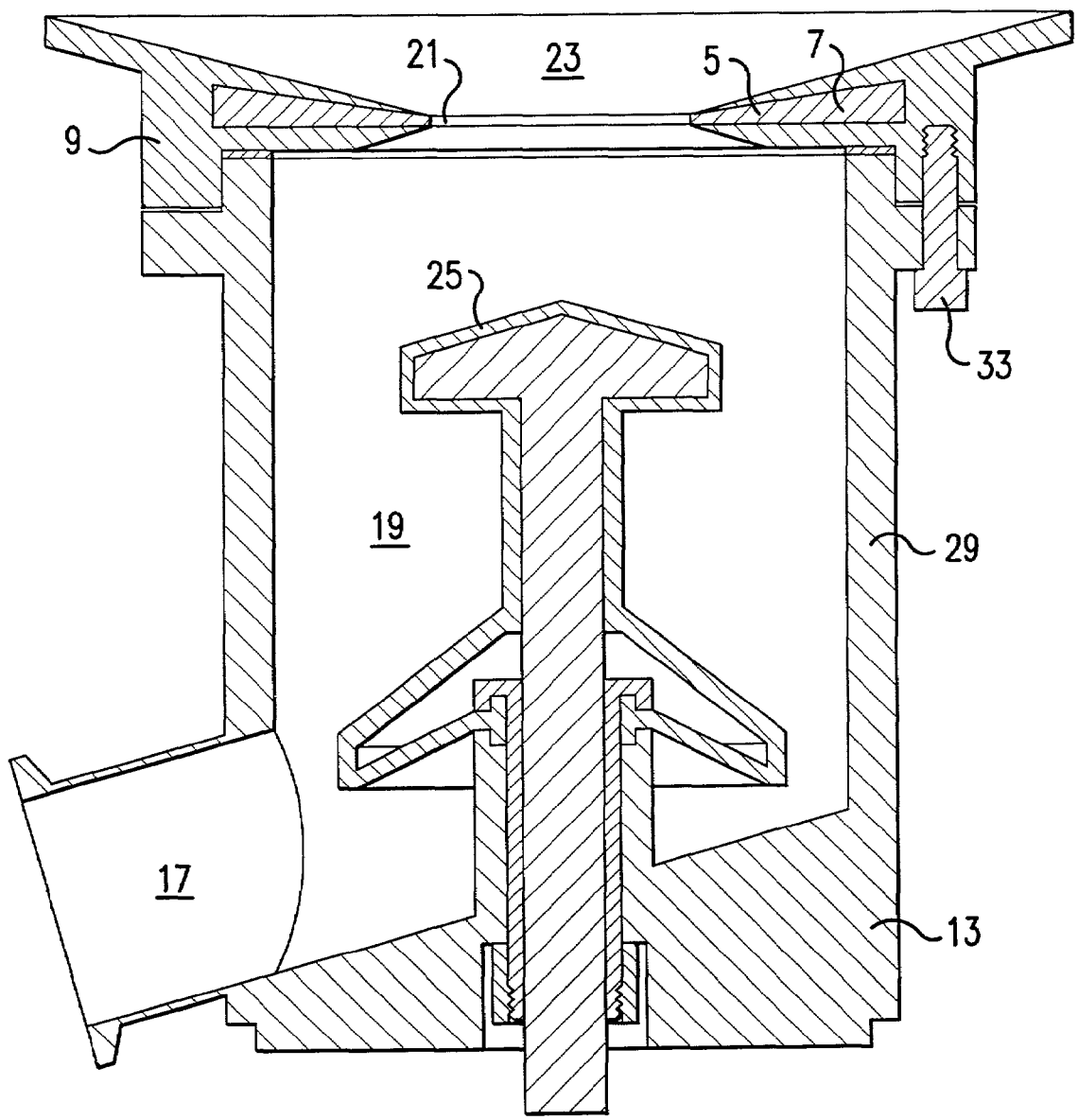
FIG. 7 is a cross-sectional view of a radial diaphragm valve according to the present invention mounted to a mounting flange of the wall of a vessel or conduit.

Referring to FIG. 7, an alternative arrangement of the flange 9 is illustrated. In this arrangement, the thermal insulation material 7 is formed from a rigid insulating material located within the annular cavity 5 of the flange 9. In the arrangement of FIG. 7, the valve body 29 meets with the flange 9 of a tank or conduit. The use of a rigid insulating material 7, such as various types of ceramics, will provide insulating properties as well as strength to the valve, particularly under compression.

Figure 8:
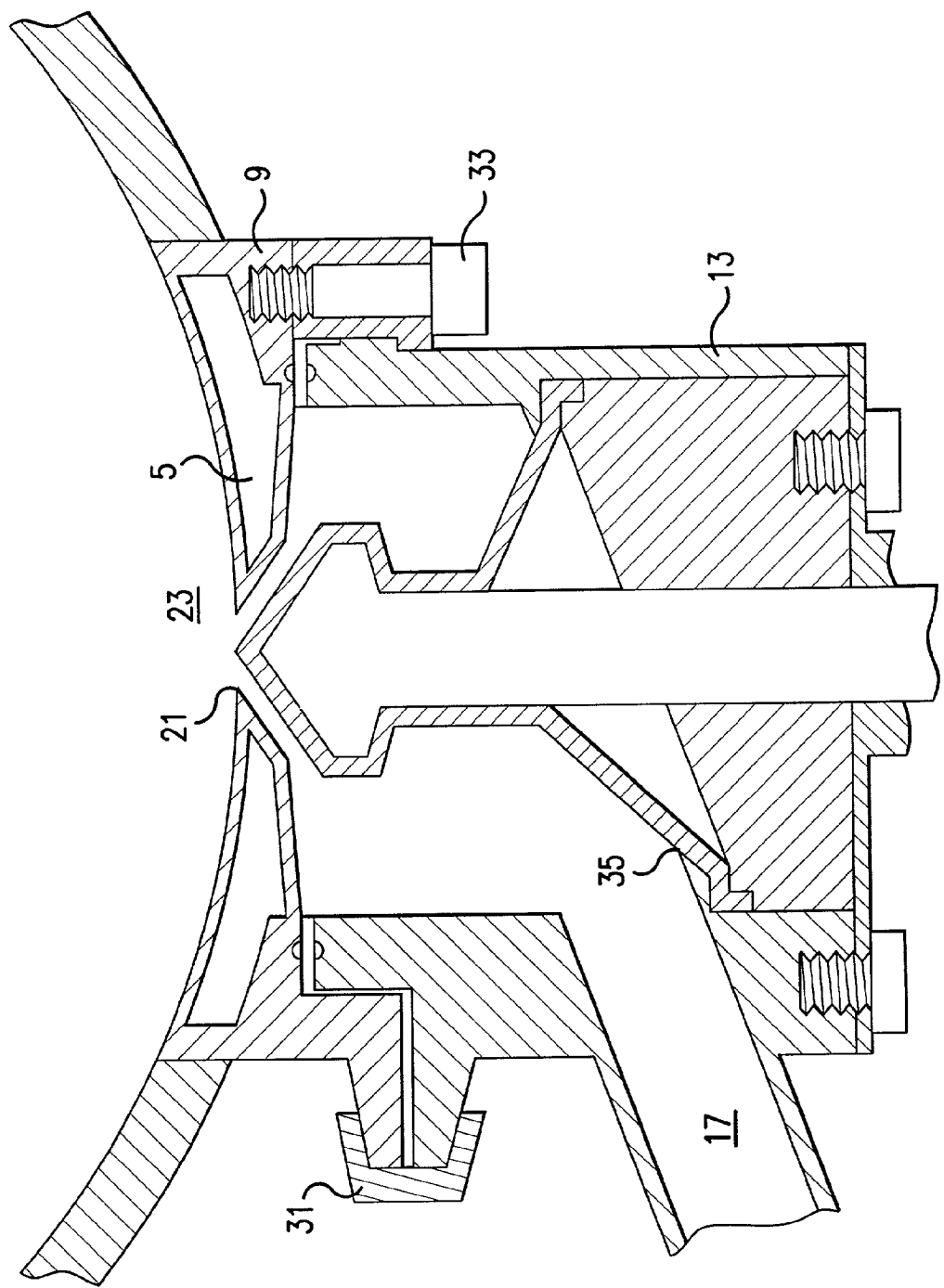
FIG. 8 is a cross-sectional view of an alternative arrangement to FIG. 7.

Referring to FIG. 8, a similar arrangement to FIG. 7 is illustrated except that the annular cavity 5 is hollow. This figure also illustrates one arrangement where the valve 13 is attached using a clamp 31, while the right side of the figure illustrates the use of a threaded bolt 33. In addition, FIG. 8 illustrates how pooling can be minimized about the static radial diaphragm-to-valve body seal by tilting the typically horizontal internal valve cavity bottom 37 (and its opposing second-side sealing surface) so that material flowing into the valve will tend to flow down the declining surface and out of the valve outlet 17.

Figure 9:
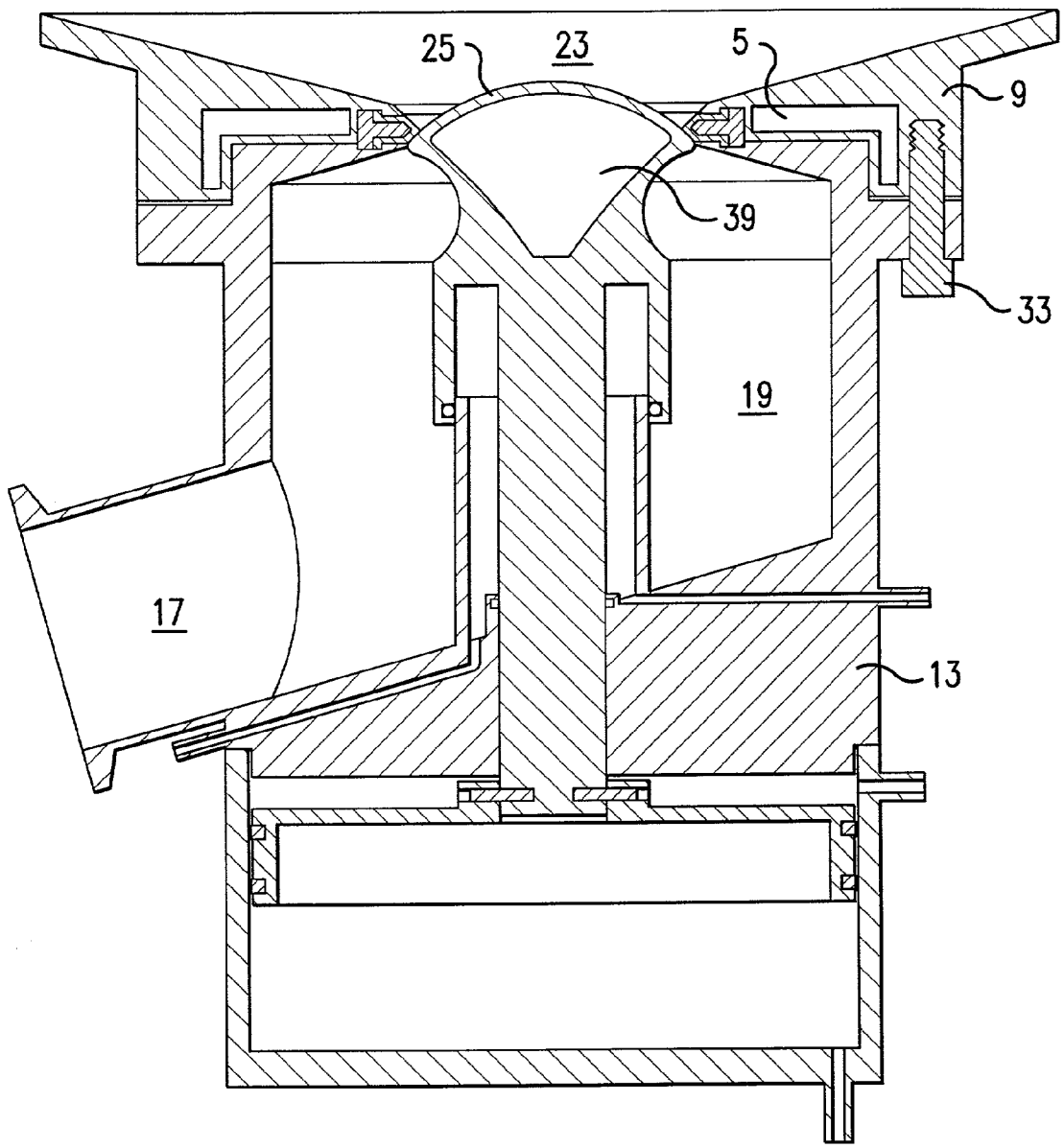
FIG. 9 is a cross-sectional view of a valve body mounted to a mounting flange of the wall of a vessel or conduit according to an alternative arrangement of the present invention.

Referring to FIG. 9, a valve 13 is mounted to a flange 9 which includes an annular cavity 5, which is illustrated as being hollow. In addition, FIG. 9 illustrates the provision of a cavity 39 formed within the sealing tip 25 of the valve 13. The cavity 39 can be filled with an insulating material to minimize heat transfer from the internal cavity 19 into the interior 23 of the vessel or conduit.

It should be noted that the arrangement of FIG. 9 could also be used in conjunction with an annular cavity 6 formed within the valve 13 if it is so desired. Furthermore, it would also be possible to use an active insulation within the sealing tip 39.

Figure 10:
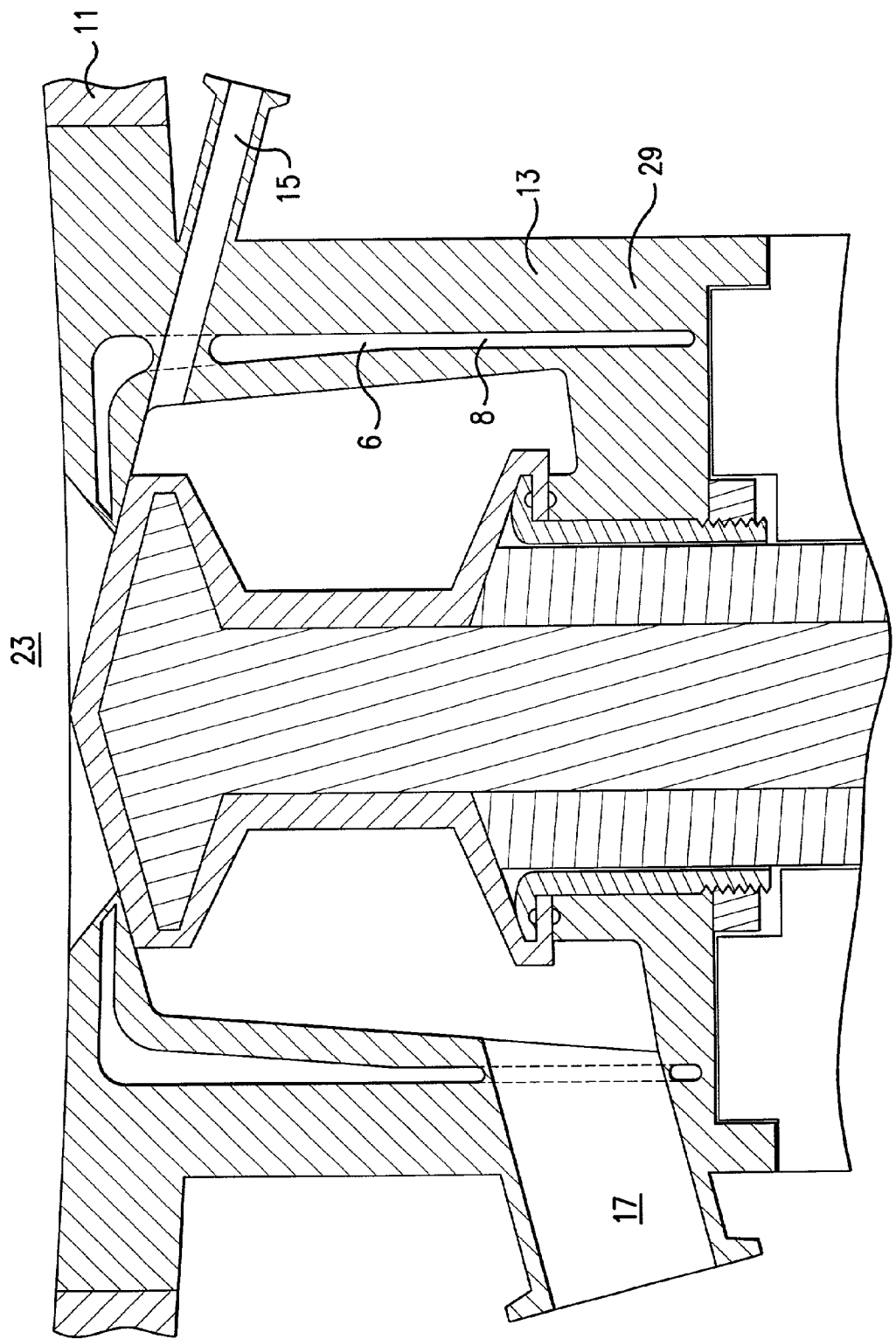
FIGS. 10 through 14 are cross-sectional views of alternative arrangements of the present invention.

Referring to FIGS. 10–13, an arrangement wherein the valve 13 is directly attached to the wall 11 of the vessel or conduit will be described. In FIG. 10, an annular cavity 6 is formed in the valve body 29. The annular cavity 6 can be filled with a thermal insulation material 8 if desired. The annular cavity 6 in FIG. 10 is of L-shaped cross-section in order to surround the internal cavity 19 of the valve 13. In this manner, the flow of heat through the valve body 29 is prevented to thereby protect the process within the interior 23 of the vessel or conduit 10.

Figure 11:
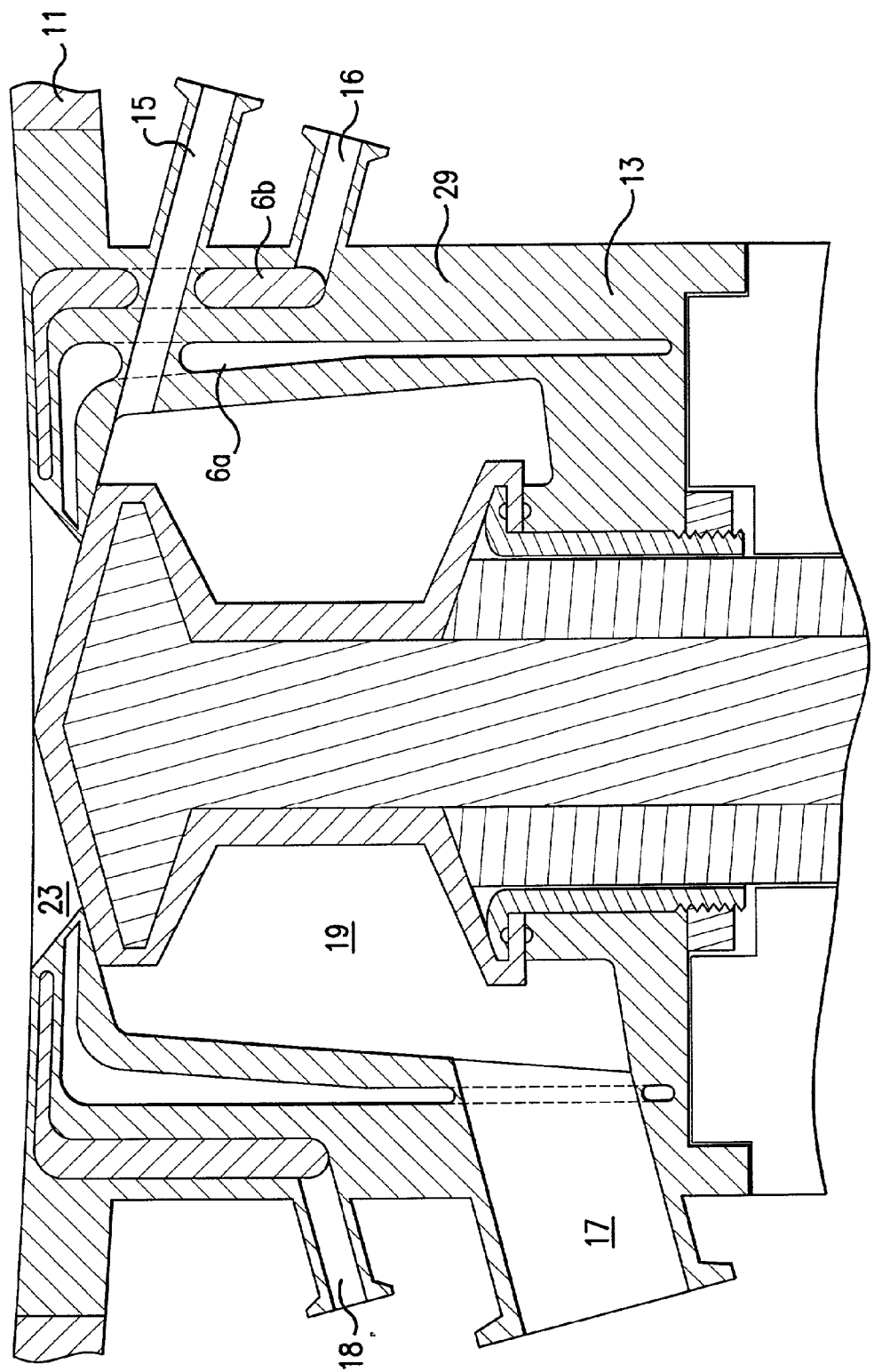

In FIG. 11, a first annular cavity 6a and a second annular cavity 6b are illustrated. Each of the annular cavities 6a and 6b are formed in the valve body 29 of the valve 13. In the embodiment of FIG. 11, the annular cavity 6b is an active thermal insulation. Specifically, the annular cavity 6b includes an inlet 16 and an outlet 18 in communication therewith. A flowable material can flow through the inlet 16 and into the annular cavity 6b and out of the outlet 18. With this arrangement, the transfer of heat from the internal cavity 19 can be controlled to ensure that the process within the interior 23 of the vessel or conduit 10 is protected. In a preferred form, the flowable material is a cooled liquid material such as water or refrigerant. By combining the annular cavity 6a with the annular cavity 6b, cooling can be provided to the process side with the active thermal insulation in the annular cavity 6b, while isolating the cooling from the internal cavity 19 of the valve body 29 with the passive thermal insulation in the annular cavity 6a. This ensures that the process remains cool and the internal cavity 19 of the valve body 29 can simultaneously be brought to sterilizing temperature.

Figure 12:
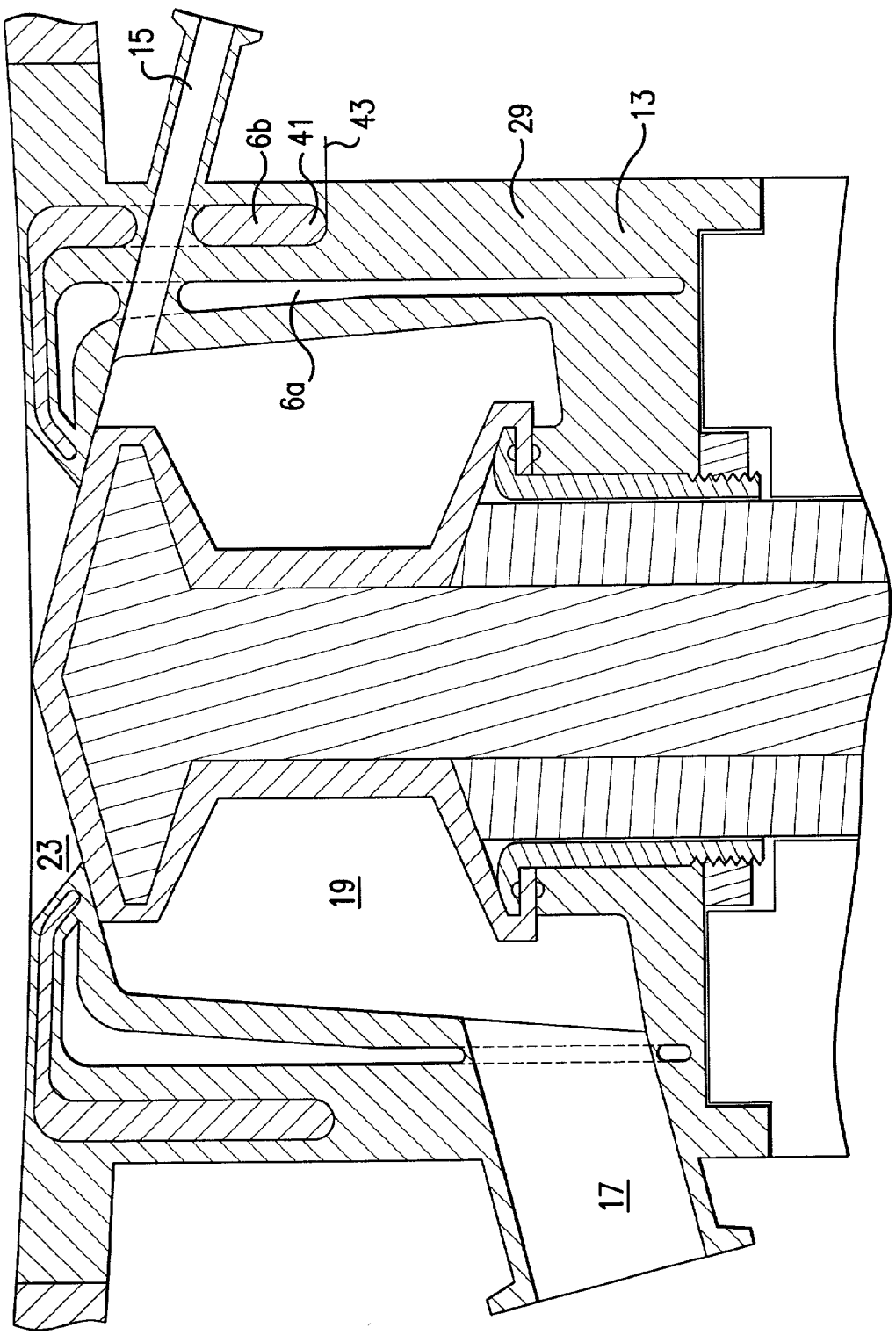

Referring to FIG. 12, an alternative arrangement of the present invention is illustrated. In this arrangement, an annular cavity 6a and an annular cavity 6b are provided in the valve body 29 of the valve 13. In this arrangement; however, the annular cavity 6a provides passive thermal insulation and the annular cavity 6b includes a thermoelectric unit 41 therein. The thermoelectric unit 41 includes leads 43 extending to an outer surface of the valve body 29. The use of a thermoelectric unit 41 will provide the advantage of controlled heating and cooling of the annular cavity 6b to ensure that the process within the interior 23 of the vessel or conduit 10 is protected from any difference in temperature within the internal cavity 19 of the valve 13 during sterilization or cleaning.

It should be understood that multiple of the thermoelectric units 41 can be included within the valve body 29 instead of, or in addition to the annular cavity 6a with the passive thermal insulation.

In FIG. 12, the cooling layers of the thermoelectric units 41 face the adjacent process and the heating layers face away from the process. The cooling portion of the thermoelectric unit adjacent the orifice serves two purposes simultaneously. First, it provides cooling on its upper process side to protect the process. Second, it radiates the heat downward toward the internal cavity of the valve body and, most particularly, toward the annular sealing surface area that mates with the movable sealing tip. By placing the thermoelectric elements close to the sealing area with the heating side facing down towards the seal (and away from the process) and cooling side toward the process, this provides active enhancement of the cooling on the process side while actively supplying heating toward the annular sealing surface.

Figure 13:
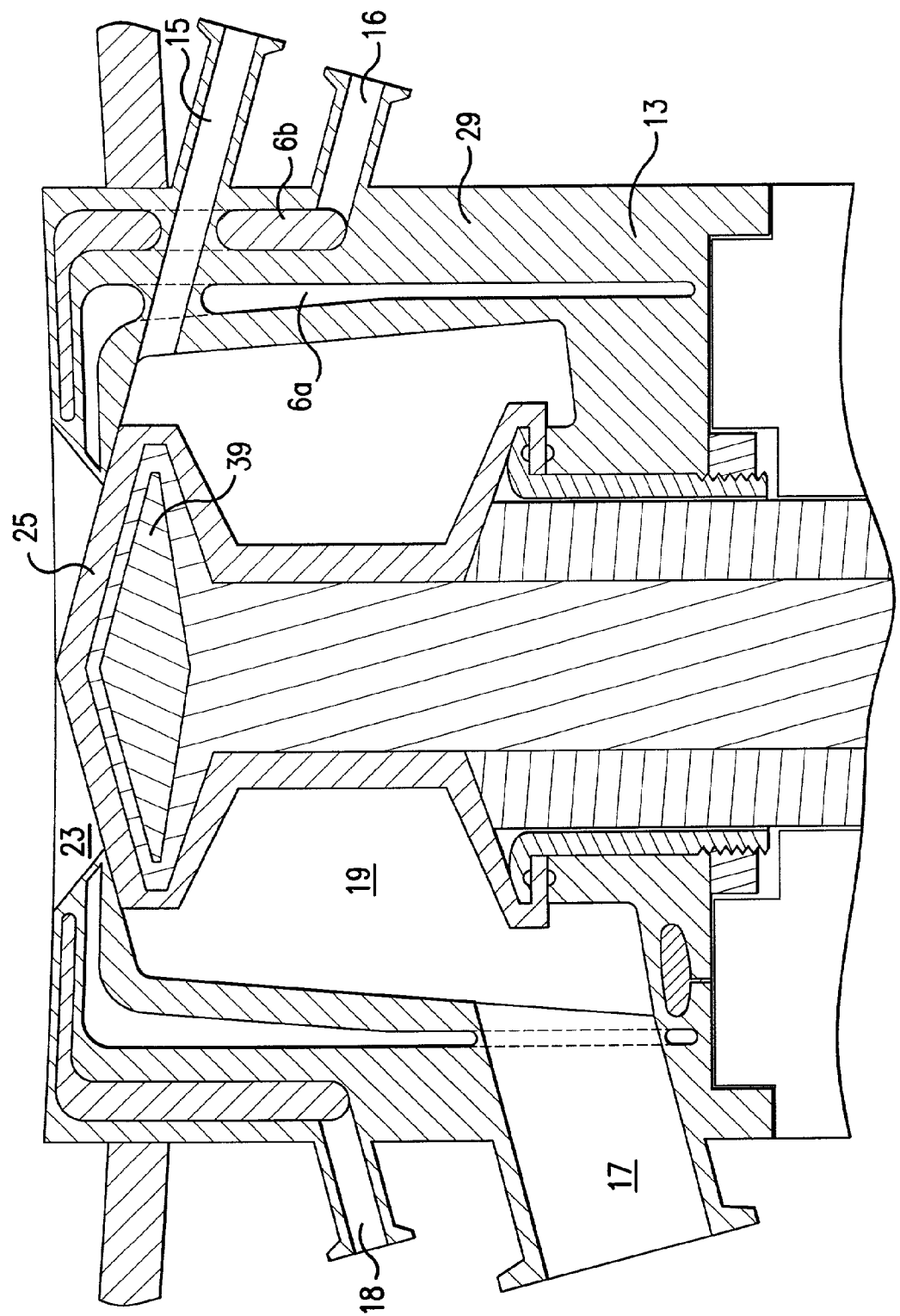

Referring to FIG. 13, an alternative arrangement of the present invention is illustrated wherein the sealing tip 25 includes a cavity 39 formed therein. The cavity 39 can be filled with a thermal insulation material or can be hollow. In addition, an annular cavity 6b is illustrated as being an active thermal insulation with an inlet 16 and an outlet 18 for the flow of material therethrough. However, it should be understood that a thermoelectric unit 41 can be used instead of the use of a flowable material.

In addition, it should be noted that the sealing tip 39 can also include an active thermal insulation instead of the passive thermal insulation in the figure.

Figure 14:
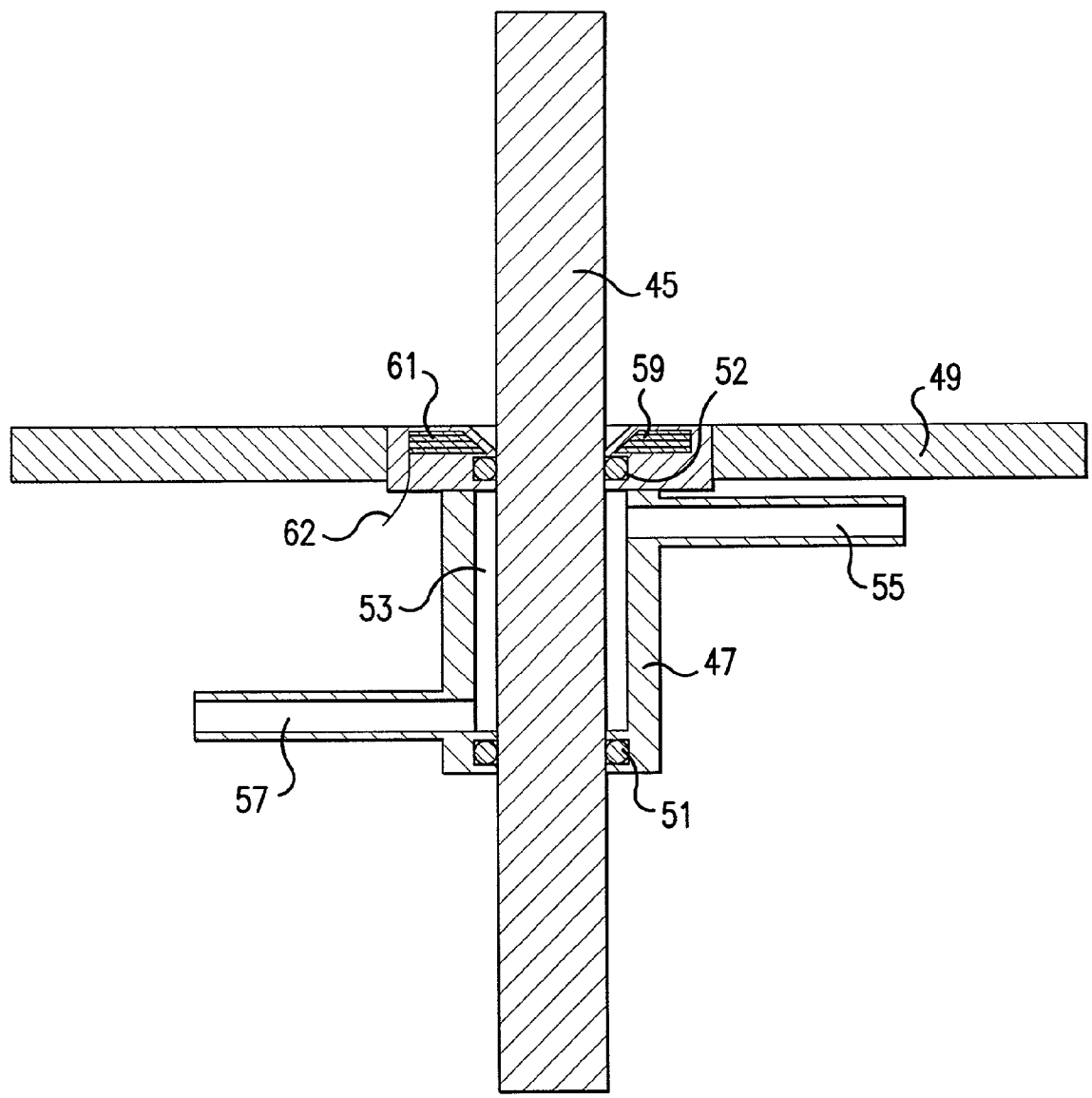

Referring to FIG. 14, an alternative arrangement of the present invention is illustrated. A shaft 45 is mounted for reciprocation or rotation in a seal housing 47. The seal housing 47 is mounted in a wall 49. The wall 49 can be a vessel, a conduit, or a valve body. The seal housing 47 includes a double seal, which in FIG. 14 is illustrated as two o-ring seals 51 and 52. In addition, an annular space 53 is formed around the shaft 45 between the o-ring seals 51 and 52. The annular space 53 is in communication with an inlet 55 and an outlet 57. The inlet 55 is connectable to a flowable source of cleaning or sterilizing material, for example, steam.

The above arrangement is used to ensure that no contaminants seep through the double seal and into an interior of the vessel, conduit or valve body to damage the process therein. For example, in the case of the wall 49 being a wall of a vessel, the shaft 45 may be attached to an agitator within the vessel (not shown). Accordingly, an actuator (not shown) will be attached to an opposite end of the shaft 45. The actuator will rotate the shaft to operate the agitator. During operation of the agitator, material from outside the seal in the shaft may seep through into the vessel over time. In view of this, a continuous or intermittent sterilization of the annular space 53 is advantageous. However, if the sterilizing material is a heated media, the heat transfer through the seal housing 47 may damage the process within the vessel. In view of this, an annular cavity 59 is provided in the seal housing 47 between the annular space 53 and the interior of the vessel. The annular cavity 59 can include any type of passive or active thermal insulation or the portion of the seal housing can be formed from a thermal insulation material. However, in FIG. 14, the annular cavity is illustrated as including a plurality of thin thermoelectric units 651 therein, which are connected to an exterior of the seal housing 47 by leads 62. In this way, the interior of the vessel can be thermally shielded to control the local wall temperature and therefore the temperature of the interior of the vessel and process therein.

It should also be noted that the same construction can be used if the shaft 45 is an actuator rod for a valve. The internal cavity of the valve can be protected from excessive heat in situations where a sterilization is occurring outside of the internal cavity in the annular space 53. Of course, the top of the shaft 45 would be attached to a sealing tip to open and close an orifice of the valve, and a bottom of the shaft 45 would be attached to a manual or automatic actuator to provide reciprocation to the shaft 45.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A valve assembly, comprising:
    a vessel or conduit, said vessel or conduit including a process on an interior thereof; and
    a valve, said valve including:
        a valve body;
        an internal cavity formed in said valve body;
        an orifice formed in said valve body, said orifice being in communication with said internal cavity and said interior of said vessel or conduit;
        a sealing tip for opening and closing said orifice; and
        an outlet formed in said valve body, said outlet being in communication with said internal cavity,
        wherein at least one of said valve body, said sealing tip and said vessel or conduit includes at least one space formed therein between said interior of said vessel or conduit and said internal cavity, said at least one space including an active or passive thermal insulation forming at least a partial barrier to the flow of heat between said internal cavity and said interior of said vessel or conduit.

2. The valve assembly according to claim 1, wherein said thermal insulation is a passive thermal insulation, said passive thermal insulation including a thermal insulation material at least partly filling said at least one space.

3. The valve assembly according to claim 1, wherein said thermal insulation is a passive thermal insulation, said passive thermal insulation including said at least one space being empty.

4. The valve assembly according to claim 1, wherein said thermal insulation is an active thermal insulation, said active thermal insulation being at least one thermalelectric unit.

5. The valve assembly according to claim 1, wherein said thermal insulation is an active thermal insulation, said active thermal insulation including a connection to a source of flowable material for flow of the flowable material through said at least one space, said flowable material being of a predetermined temperature to control a temperature of said at least one space.

6. The valve assembly according to claim 5, wherein said connection includes an inlet and an outlet in communication with said at least one space, said inlet of said at least one space being in communication with said source of flowable material.

7. The valve assembly according to claim 1, wherein said vessel or conduit includes a flange or ferrule for mounting said valve body thereto, said at least one space being formed in said flange or ferrule.

8. The valve assembly according to claim 1, wherein there are a plurality of said at least one space forming at least two layers between said internal cavity of said valve body and said interior of said vessel or conduit.

9. The valve assembly according to claim 8, wherein at least one of said plurality of spaces is an active thermal insulation and at least one other of said plurality of spaces is a passive thermal insulation.

10. The valve assembly according to claim 1, wherein said at least one space is formed within said sealing tip of said valve.

11. The valve assembly according to claim 1, wherein said at least one space is formed within said valve body.

12. The valve according to claim 1, wherein there are a plurality of said at least one space forming at least two layers between said internal cavity of said valve body and the interior of the vessel or conduit.

13. The valve according to claim 12, wherein at least one of said plurality of spaces is an active thermal insulation and at least one other of said plurality of spaces is a passive thermal insulation.

14. The valve according to claim 1, wherein said at least one space is formed within said sealing tip of said valve.

15. The valve according to claim 1, wherein said at least one space is formed within said valve body.

16. A valve for a vessel or conduit, the vessel or conduit for containing a process in an interior thereof, said valve comprising:
    a valve body;
    an internal cavity formed in said valve body;

an orifice formed in said valve body, said orifice being in communication with said internal cavity and an interior of said vessel or conduit;
a sealing tip for opening and closing said orifice; and
an outlet formed in said valve body, said outlet being in communication with said internal cavity,
wherein at least one of said valve body and said sealing tip includes at least one space formed therein between the interior of the vessel or conduit and said internal cavity, said at least one space including an active or passive thermal insulation forming at least a partial barrier to the flow of heat between said internal cavity and the interior of the vessel or conduit.

17. The valve according to claim 16, wherein said thermal insulation is a passive thermal insulation, said passive thermal insulation including a thermal insulation material at least partly filling said at least one space.

18. The valve according to claim 16, wherein said thermal insulation is a passive thermal insulation, said passive thermal insulation including said at least one space being empty.

19. The valve according to claim 16, wherein said thermal insulation is an active thermal insulation, said active thermal insulation being at least one thermalelectric unit.

20. The valve according to claim 16, wherein said thermal insulation is an active thermal insulation, said active thermal insulation including a connection to a source of flowable material for flow of the flowable material through said at least one space, said flowable material being of a predetermined temperature to control a temperature of said at least one space.

21. The valve according to claim 20, wherein said connection includes an inlet and an outlet in communication with said at least one space, said inlet of said at least one space being in communication with said source of flowable material.

* * * * *